Feb. 26, 1952   H. LOWENTHAL   2,587,347
HIGH-SPEED FOUR COMPONENT PHOTOGRAPHIC OBJECTIVE
Filed Nov. 4, 1948
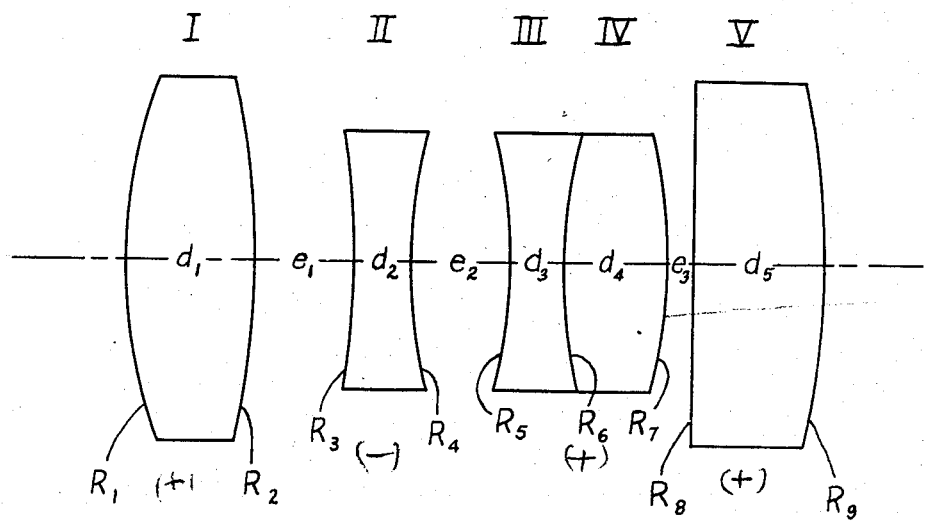
Inventor:
Herman Lowenthal,
By Zabel & Gritzbaugh
    Attorneys.

Patented Feb. 26, 1952

2,587,347

UNITED STATES PATENT OFFICE 2,587,347

HIGH-SPEED FOUR-COMPONENT PHOTOGRAPHIC OBJECTIVE

Herman Lowenthal, Chicago, Ill., assignor to General Scientific Corporation, Chicago, Ill., a corporation of Illinois Application November 4, 1948, Serial No. 58,230

5 Claims. (Cl. 88—57)

This invention relates to a photographic objective having four components which is highly corrected and which is at the same time capable of high speed. As is well known, objectives do not represent serious design problems as long as relatively small lens apertures are used. However, any attempt to increase the lens aperture even at the expense of some reduction in working angle creates serious problems. Thus unless the Petzval condition is satisfied, it is difficult to correct for both astigmatism and curvature of field. These two corrections are of great importance with respect to the quality of a lens system. The Petzval sum, which is usually considered a constant in a multi-lens objective corrected for color, aberrations and astigmatism, determine the flatness of the image. By virtue of this invention, the overall power of the third lens component may be maintained at desired values but the two lenses making up this component are related as hereinafter disclosed so that the Petzval sum may be changed substantially from what has been considered its optimum value. This is done without impairing chromatic aberration and indeed results in overall improved correction of the field.

In addition to the above corrections, the new objective may have the usual corrections for spherical aberration, coma (Abbe's sine condition) chromatic aberration and distortion, particularly that due to variation of magnification with distance from the objective axis.

The invention may be applied to an objective of four components in air with the third component consisting of a cemented doublet. The significant changes over prior art objectives are localized in the third and fourth components. By virtue of these changes greater flexibility in the choice of glass for the first two components is possible. In particular, a greater variety of glasses having different dispersions and refractive indices may be used. Inasmuch as the refractive index and dispersion of the light transmitting medium are fundamental constants relied upon for corrections, it will be evident that the new objective is susceptible to greater latitude in design and thus may be more adequately corrected than prior art objectives while maintaining substantial angle of coverage and speed of operation.

In accordance with the invention, the third (doublet) and fourth components are made of glasses having substantially equal dispersion. As is well known, the dispersion of a glass is the variation in refractive index with respect to variation of wave-length of light transmitted. In addition, the invention provides that the third lens element (the intervening air is excluded in this designation) is equi-concave or substantially equi-concave (within about 25%) while the fifth lens element is always plano-convex, the plane side being at the entrance side of the lens system.

By virtue of the above invention, a four component objective may be provided having substantially complete correction, including correction for upper and lower rim ray agreement with the principal ray. By making the positive element of the doublet of glass having a high index of refraction, such as about 1.66, and by making the negative element of the doublet of glass having a smaller index of refraction, the index difference at the cemented surface is made large enough so that rim ray agreement is obtained by control of the radius of curvature of the cemented surfaces of the doublet. The two indices are so selected as to provide for an index difference of about .10 to about .15 with the preferred difference being about .13. The radius of curvature at the cemented surfaces of the doublet may vary from about 30% to about 50% of the focal distance of the objective.

In order that the invention may be more fully understood, it will be described in connection with the drawing and some examples of objectives will be given. The single figure in the drawing illustrates an objective embodying the present invention.

The usual conventions will be observed in assuming that light goes from left to right and that radii will be positive or negative if the center of curvature is respectively to the right or left of the lens surface.

Lenses I and II may be ordinary components such as used in a corrected objective of three components. Thus lens I will have $R_1$ and $R_2$ positive and negative respectively. $R_1$ may be about 25% of the focal distance of the entire objective. $R_2$ is large and may be between about four and ten times the objective focal distance. The lens thickness along the lens axis, indicated by $d_1$, is small in comparison to the focal distance of the objective, about 5%.

The axial distance $e_1$ between the opposed lens surfaces of I and II (this is really the thickness of an air lens) is also small in comparison to the objective focal distance and is generally of the same order as $d_1$. Lens II has $R_3$ negative and generally between $R_1$ and $R_2$ in absolute value. Thus $R_3$ may be somewhat larger than about one-half of the objective focal distance. $R_4$ is positive and may generally be about the same as $R_1$. Lens II naturally has small axial dimension $d_2$. Mechanical considerations make it desirable to have $d_2$ large enough so the lens can be safely handled. In practice, with the focal lengths which may be used in the new objective, $d_2$ may be about one-half of $d_1$. Separation $e_2$ is somewhat smaller than $e_1$ but generally is of the same order. A diaphragm stop may be disposed between lens II and III so that $e_2$ in practice should preferably be great enough for the mechanical elements of the diaphragm. However, the diaphragm or iris may be disposed between lenses I and II instead.

Lenses I and II may be made of a variety of glasses. Preferably the refractive indices are fairly high ($N_D$=1.61 to about 1.62) with lens II having the higher index. The dispersion numbers of the glasses for these two lenses must vary substantially, being high (about 58) for I and low (about 36) for II.

The doublet, lenses III and IV, consists of glasses having about the same dispersion (somewhat less than for lens I but decidedly greater than for lens II), and different indices of refraction. Lens III has the lower index glass with $R_5$ being negative and somewhat greater than $R_4$. $R_6$ is positive and about the same or maybe somewhat less than $R_5$. A difference of about 20% between $R_5$ and $R_6$ is permissible, the exact amount naturally being subject to computation. Thickness $d_3$ may be about the same as $d_2$.

Lens IV has its forward surface nesting within the rear surface of lens III so that $R_6$ is common to the two. $R_7$ is negative and somewhat greater than $R_5$ or $R_6$. Thus $R_7$ may be about 40% of the focal distance of the objective system. Thickness $d_4$ is somewhat less than $d_1$.

Lens V is preferably of the same glass as IV with the entrance side flat. This makes $R_8$ infinite. Spacing $e_3$ between IV and V is small in comparison to other spacings. $R_9$ is negative and is generally larger than any of the other radii except $R_2$ and $R_8$. In practice $R_9$ is about ($N_D-1$) times the focal distance of the objective.

It is understood that the curved lens surfaces are parts of spherical surfaces.

Examples of some lens objectives will now be given:

Example I

Focal distance=100. Back focal distance=87.6.
Aperture=f/4.5. Coverage angle 36°.

| Lens | $N_D$ | V | Radii | Axial distances |
|---|---|---|---|---|
| I | 1.611 | 58.8 | $R_1$=+ 27.70<br>$R_2$=−424.00 | $d_1$=5.0<br>$e_1$=4.3 |
| II | 1.617 | 36.6 | $R_3$=− 60.28<br>$R_4$=+ 25.81 | $d_2$=2.0<br>$e_2$=3.6 |
| III | 1.5305 | 51.6 | $R_5$=− 38.10<br>$R_6$=+ 33.05 | $d_3$=2.0 |
| IV | 1.65838 | 51.1 | | $d_4$=4.0<br>$e_3$=0.5 |
| V | 1.65838 | 51.1 | $R_7$=− 40.76<br>$R_8$=inf.<br>$R_9$=− 67.45 | $d_5$=4.7 |

Example II

Focal distance=100. Back focal distance=87.07.
Aperture=f/4.5. Coverage angle 46°.

| Lens | $N_D$ | V | Radii | Axial distances |
|---|---|---|---|---|
| I | 1.611 | 58.8 | $R_1$=+ 28.5<br>$R_2$=−520.70 | $d_1$=5.0<br>$e_1$=4.3 |
| II | 1.617 | 36.6 | $R_3$=− 67.70<br>$R_4$=+ 27.00 | $d_2$=2.0<br>$e_2$=4.3 |
| III | 1.5305 | 51.6 | $R_5$=− 42.40<br>$R_6$=+ 42.40 | $d_3$=2.0 |
| IV | 1.65838 | 51.1 | | $d_4$=4.0<br>$e_3$=0.5 |
| V | 1.65838 | 51.1 | $R_7$=− 45.17<br>$R_8$=inf.<br>$R_9$=− 67.30 | $d_5$=5.5 |

Example III

Focal distance=100. Back focal distance=85.17.
Aperture=f/4. Coverage angle 32°.

| Lens | $N_D$ | V | Radii | Axial distances |
|---|---|---|---|---|
| I | 1.620 | 60.0 | $R_1$=+ 29.60<br>$R_2$=−1057.00 | $d_1$=4.3<br>$e_1$=6.1 |
| II | 1.617 | 36.6 | $R_3$=− 66.50<br>$R_4$=+ 28.66 | $d_2$=1.5<br>$e_2$=5.6 |
| III | 1.530 | 51.8 | $R_5$=− 44.70<br>$R_6$=+ 44.70 | $d_3$=1.5 |
| IV | 1.657 | 51.2 | | $d_4$=4.0<br>$e_3$=1.0 |
| V | 1.657 | 51.2 | $R_7$=− 45.92<br>$R_8$=inf.<br>$R_9$=− 66.80 | $d_5$=5.0 |

In the above examples, $N_D$ represents the index of refraction, V represents the dispersion index or Abbe V dispersion number, $d$ and $e$ with their subscripts are axial distances as shown in the drawing. The back focal distance is the axial distance from the rear vertex (last surface) of lens V to the image of an infinitely distant object.

The Petzval radii for the above examples are about five to seven times the focal distance, or between 500 and 700 in the above examples. The objectives given above are useful for making small size negatives of relatively flat objects such as micro-filming office records and may also be used in aerial photography. Other uses for objectives embodying the invention will be apparent to those skilled in the art.

In accordance with convention, a lens or component will be regarded as positive when a real image is formed and negative when a virtual image is formed of a distant object. In the new objective described herein, the first component is positive, the second component is negative. The third component consists of negative lens III and positive lens IV, the component as a whole being predominantly positive. The last component, lens V is positive. The entire objective is positive.

From the above description it is thought that the construction and advantages of this invention will be readily apparent to those skilled in the art. Various changes and modifications may be made without departing from the spirit or losing the advantages of the invention.

Having thus described the invention, what I claim as new and desire to secure by Letters Patent is:

1. A photographic objective having four components axially spaced from each other in air, the first component being positive and having an axial thickness of the order of substantially 5% of the focal distance of the objective, the second component being negative and having an axial thickness substantially one-half of the axial thickness of the first component and the axial separation between the first and second components being also of the same order as the axial thickness of the first component, the third component being a cemented doublet, the axial separation between the adjacent lens surfaces of the second and third components being substantially smaller than, but of the same order as, the axial lens separation between the first and second components, the fourth component being substantially plano-convex, said third component consisting of positive and negative elements having different refractive indices with the positive element having an index of substantially 1.66 and the negative element having a smaller index and the difference between the two being no more than .15, said third and fourth components all having substantially the same dispersion, said first and second components respectively having higher and lower dispersion numbers than the remaining components, said negative element being substantially equi-concave with the radii being between substantially 35% and 50% of the focal distance of the objective, the fourth component being substantially plano-convex with the last radius being substantially equal to the focal distance of the objective multiplied by the difference between the index of refraction of said fourth component and one.

2. The objective according to claim 1 wherein the negative element of the doublet is substantially equi-concave.

3. A photographic objective having four components axially spaced from each other in air, the first component being positive with $R_1$ being between 25% and 30% of the objective focal distance and $R_2$ being between substantially 4 and 10 times the objective focal distance, the second component being a negative lens with $R_3$ being substantially over 50% of the focal distance of the objective and $R_4$ being substantially equal to $R_1$, the first component having $N_D$ substantially 1.611 and V substantially 58, the second component having $N_D$ substantially 1.617 and V substantially 36, the third component consisting of cemented positive and negative elements to form a doublet, the negative element being substantially equi-concave with the radii being between substantially 35% and 50% of the focal distance of the objective, the negative element having $N_D$ substantially 1.53 and the positive element having $N_D$ substantially 1.66 and having V substantially 51, the fourth component being substantially plano-convex with the last radius being substantially equal to $(N_D-1)$ times the focal distance of the objective, and $N_D$ and V being equal to that of the positive element of the doublet, where R is the radius of curvature and the subscripts indicate sequence, $N_D$ and V being respectively the index of refraction and dispersion.

4. The objective according to claim 3 wherein the axial lens thickness and lens spacing are such that the back focal distance is between 85% and 90% of the objective focal distance.

5. The objective according to claim 3 wherein the lens thickness of the first lens is of the order of substantially 5% of the focal distance of the objective, the axial distance between opposed lens surfaces of the first and second lens being of the order of substantially 5% of the focal distance of the objective, the axial lens thickness of the second lens being substantially one-half of the axial lens thickness of the first lens and the separation along the axis between the second and third lenses being smaller but of the same general order as the axial separation between the first and second lens.

HERMAN LOWENTHAL.

REFERENCES CITED

The following references are of record in the file of this patent:

UNITED STATES PATENTS

| Number | Name | Date |
|---|---|---|
| 660,202 | Rudolph | Oct. 23, 1900 |
| 1,888,156 | Bielicke | Nov. 15, 1932 |
| 2,171,640 | Berek | Sept. 5, 1939 |
| 2,466,424 | Herzberger | Apr. 5, 1949 |

FOREIGN PATENTS

| Number | Country | Date |
|---|---|---|
| 299,983 | Great Britain | Nov. 8, 1928 |